United States Patent Office 3,751,392
Patented Aug. 7, 1973

3,751,392
PROCESS OF FOAMING POLYURETHANES WITH INORGANIC HYDRATED METAL SALTS
Franciszek Olstowski, Freeport, Tex., assignor to The Dow Chemical Company, Midland, Mich.
No Drawing. Filed Apr. 24, 1972, Ser. No. 246,922
Int. Cl. C08g 22/44
U.S. Cl. 260—2.5 AB
6 Claims

ABSTRACT OF THE DISCLOSURE

Polyurethane foams are prepared employing as the blowing agent an inorganic hydrated metal salt characterized as having a solubility in anhydrous ethanol at 20° C. of less than 1.2 grams/100 grams of ethanol and which exhibits a weight loss of at least about 5% when subjected to a temperature of 115° C. for 30 minutes. The blowing is due to the steam developed from the removal of a portion of the water of hydration and not from $CO_2$ as a result of reaction of such removed water with the isocyanate. When the inorganic hydrated metal salt is not a hydrated alkali metal aluminate, the use of a heavy metal carboxylate catalyst is essential to obtain foaming by steam rather than $CO_2$.

---

This invention relates to polyurethane foams and a process for preparing them wherein the blowing agent employed is a hydrated metal salt.

Polyurethane foams have previously been prepared employing water as the blowing agent. However, $CO_2$ (formed by the reaction of the water with the polyisocyanate thereby forming $CO_2$ and a disubstituted urea) is the actual blowing agent. U.S. 2,577,279 has taught the use of metal salt hydrates which are soluble in anhydrous ethyl alcohol as a supplemental source for water in water blown foams prepared from relatively high acid number polyester (alkyd resin)-isocyanate reactions.

It has now been discovered that certain metallic salt hydrates when added to a polyol-polyisocyanate reactant blend subsequently catalyzed with a heavy metal carboxylate produces a polyurethane foam wherein the blowing or foaming is essentially accomplished with steam liberated from the hydrated salt via the heat of reaction from the polyol-isocyanate reaction.

The polyurethane foams of the present invention are prepared from a mixture comprising:

(A) a polyether polyol or ester-modified polyether polyol having an average hydroxyl functionality of from 2 to about 8 and an average hydroxyl equivalent weight of from about 31 to about 1000 and preferably from about 45 to about 700, (B) an organic polyisocyanate having an average functionality of at least 2, (C) from about 1 to about 70, preferably from about 3 to about 50 percent by weight based upon the combined weight of (A), (B) and (C) of an inorganic metal hydrate characterized as having a solubility in anhydrous ethyl alcohol of less than about 1.2 grams per 100 grams and a weight loss of at least 5% and preferably at least about 8% when subjected to a temperature of 115° C. for 30 minutes, at atmospheric pressure, (D) from about 0.01% to about 5%, preferably from about 0.1% to about 2% by weight based upon the combined weights of (A), (B) and (C) of a heavy metal carboxylate catalyst for urethane formation, (E) from 0 to about 35 and preferably from about 0 to about 25% by weight based upon the combined weights of (A), (B), (C) and (E) with the proviso that the combined weight of component (C) and (E) does not exceed about 70 percent of the total formulation of a liquid modifier compound having a boiling point of at least about 150° C. at atmospheric pressure, with the proviso that when component (A) has an average functionality of 2, component (B) has an average functionality of greater than 2.5 and wherein components (A) and (B) are present in quantities such that the NCO:OH ratio is from about 0.8:1 to about 2:1 and preferably from about 0.9:1 to about 1.5:1, with the further proviso that when component (C) is a hydrated alkali metal aluminate, then component (D) can be absent from the composition.

Suitable polyols which are employed in the present invention as component (A) include polyester polyols, polyether polyols and ester-modified polyether polyols.

Suitable polyether polyols include the oxyalkylated derivatives of a polyhydric compound having 2 or more reactive hydroxyl groups such as, for example, ethylene glycol, propylene glycol, glycerine, trimethylol propane, pentaerythritol, sucrose, novolac resin, p,p'-isopropylidine diphenol, mixtures thereof and the like.

Other suitable polyols include the oxyalkylated derivatives of an amine compound such as, for example, ammonia, ethylenediamine, propylenediamine, 1,6-hexanediamine, diethylenetriamine, triethylenediamine, tetraethylenepentamine, mixtures thereof and the like.

Suitable oxyalkylating agents which are reacted with the hydroxyl-containing or amine-containing compounds or mixtures thereof, include, for example, such vicinal epoxides as ethylene oxide, propylene oxide, 1,2-butylene oxide, 2,3-butylene oxide, epichlorohydrin, epibromohydrin, styrene oxide, butylglycidyl ether, phenylglycidyl ether, mixtures thereof and the like.

Suitable polyester polyols include those hydroxyl terminated reaction products of a dibasic acid or anhydride such as, adipic acid, maleic acid, phthalic acid, their anhydrides, mixtures thereof and the like with a glycol, i.e. a dihydroxyl containing compound such as, for example, ethylene glycol, propylene glycol, 1,4-butane diol, 1,6-hexane diol, mixtures thereof and the like.

Suitable ester-modified polyether polyols are represented by the general formula

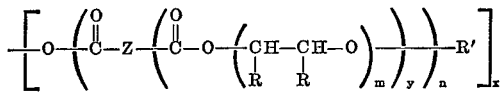

wherein A is the residue of an initiator or starting compound having from 2 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, $m$ has an average value of from about 1.0 to about 2.0, $n$ has a value from about 1 to about 5, $x$ has a value from about 2 to about 8 and $y$ has a value of 1 or 2 and wherein said ester-modified polyether compound has a hydroxyl equivalent weight above about 500.

Methods for the preparation of the ester-modified polyether polyols represented by the above formula are given in a copending application Ser. No. 67,233, filed Aug. 26, 1970 by Robert W. McAda, Jr. for Ester-Modified Polyether Polyols and in U.S. 3,502,601 and U.S. 3,585,185.

Suitable polyisocyanates which may be employed as component (B) in the compositions of the present invention include, for example, any organic polyisocyanate having 2 or more NCO groups per molecule and no other substituents capable of reacting with the hydroxyl groups of the polyol. Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene®W), naphthalene diisocyanate, dianisidine diisocyanate, polymethylene polyphenyl-isocyanate, mixtures of one or more polyisocyanates and the like.

Other organic isocyanates which may suitably be employed and which are to be included in the term organic polyisocyanate include isocyanate terminated prepolymers prepared from the previously mentioned polyols, preferably the polyether polyols, and the above mentioned isocyanates.

Suitable inorganic hydrated metal salts which are employed as component (C) in the present invention include any such salt which is essentially insoluble in anhydrous ethanol i.e. less than about 1.2% by weight and which will lose at least about 5% of its weight when subjected to a temperature of 115° C. for 30 minutes at atmospheric pressure.

Suitable such hydrated metal salts include the alkali, alkaline earth, earth and transition metal borates, carbonates, phosphates, silicofluorides and sulfates and include hydrated double salts, i.e. salts of more than one metal. Suitable hydrated metal salts include, for example, $Al_2(SO_4)_3 \cdot 18H_2O$, $CaHPO_4 \cdot 2H_2O$, $CaSO_4 \cdot 2H_2O$, $FeSO_4 \cdot 7H_2O_3$, $Na_2B_4O_7 \cdot 10H_2O$, $Na_2SO_4 \cdot 10H_2O$, $Na_2CO_3 \cdot H_2O$, $MgSO_4 \cdot 7H_2O$, $CaSiF_6 \cdot 2H_2O$, $Na_3PO_4 \cdot 12H_2O$, $Mg(NH_4)PO_4 \cdot 6H_2O$, mixtures thereof and the like.

Suitable hydrated alkali metal aluminates which can be employed and from which foams can be prepared in the absence of a catalyst include the hydrated aluminates of an alkali metal such as, for example, $Na_2Al_2O_4 \cdot 3H_2O$, $K_2Al_2O_4 \cdot 3H_2O$ and the like.

Suitable carboxylate salts of heavy metals which are employed as the catalysts, component (D), in the present invention include, for example, organo-metal compounds of tin, zinc, lead, mercury, cadmium, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mercury naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

Suitable such liquid modifier compounds which are employed as component (E) include, for example, non-hydroxyl-containing polyoxyalkylene compounds, organic phosphates, organic phosphites, organic phosphonates, fatty acids, fatty oils, cyclic ethers, aromatic compounds, partially hydrogenated aromatic compounds, organic carbonates, halogenated aliphatic compounds, cyclic sulfones, esters of carboxylic acids and mixtures thereof.

Suitable polyoxyalkylene compounds which may be employed as the liquid modifier compound, component (E), include, for example, a liquid, totally-capped or non-hydroxyl-containing block or randomly formed polyoxyalkylene glycol represented by the general formula

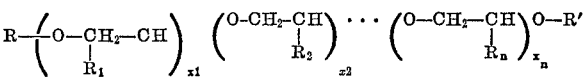

wherein R and R' are independently selected from saturated and unsaturated hydrocarbon groups having from about 1 to about 6, preferably from about 1 to about 3, carbon atoms. $R_1, R_2 \ldots$ and $R_n$ are independently hydrogen, an aryl group, an alkyl group or haloalkyl group, said alkyl or haloalkyl group having from about 1 to about 2 carbon atoms with the proviso that when $R_1, R_2 \ldots R_n$ is a haloalkyl group, it is present in minor amounts i.e. a ratio of from about 0 to about 10 percent of the total $R_1, R_2 \ldots R_n$ groups, and $x_1, x_2 \ldots x_n$ are integers, such that the boiling point of the liquid capped polyalkylene glycol is above about 150° C.

Suitable aromatic compounds which may be employed as the liquid modifier compound having a boiling point above about 150° C. in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m - dichlorobenzene, 1,3-dipropoxybenzene, 1-ethyl-4-propylbenzene, 1-fluoro-4-iodobenzene, 4-bromo-o-xylene, α - bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, Δ-chlorostyrene, mixtures thereof and the like.

The above compounds are represented by the following general formula provided it is understood that such compounds represented by the formula are liquids and have boiling points at atmospheric pressure above about 150° C.

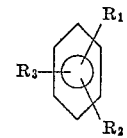

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which may be employed as the liquid modifier compound in the present invention include liquid multi-ring compounds having a boiling point above about 150° C. such as, for example, 1-chloro-naphthalene, 1-bromo-naphthalene, mixtures thereof and the like.

Suitable partially hydrogenated multi-ring aromatic compounds which may be employed as the liquid modifier compound in the present invention include, for example, 1,4-dihydronaphthalene, 1,2,3,4-tetrahydronaphthalene, mixtures thereof and the like.

Suitable organophosphorus compounds which may be employed as the liquid modifier compound include, for example, organo phosphates, organo phosphites and organo phosphonates having boiling points above about 150° C.

Organo phosphates, phosphites and phosphonates which may be employed as the liquid modifier compound include those liquid compounds represented by the formulae

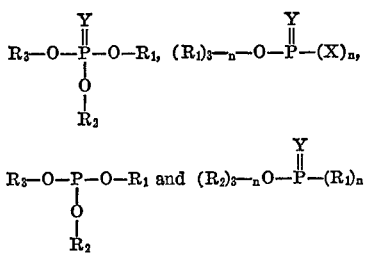

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, $n$ has a value of 1 or 2. Suitable such compounds include, for example tri-n-butyl phosphate, triethylphosphate, tricresylphosphate, tris-(beta-chloroethyl)phosphate, tris(2,3 - dibromopropyl) phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothionophosphate, ethyl dibromothiophosphate, 2 - chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

The organo phosphorus compounds may be prepared by procedures described in Organo-Phosphorus Compounds, G. M. Kosolapoff, John Wiley & Sons, Inc., 1950.

Suitable liquid organic carbonates which may be employed as the liquid modifier in the present invention include the acyclic and cyclic carbonates represented by the formulae

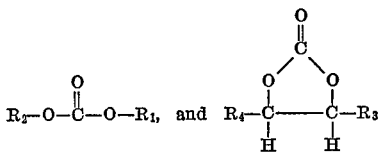

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which may be employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethylallyl carbonate, dinonyl carbonate and the like. The organic acyclic carbonate may be prepared by procedures given in U.S. Pat. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which may be employed as the liquid modifier include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150° C. may be employed as the liquid modifier in the present invention including cyclic polyethers prepared from butylene oxide, epichlorohydrin and the like.

The liquid cyclic polyether modifier compounds can be prepared by procedures mentioned in Cyclic Polyethers and Their Complex With Metal Salts by C. J. Pedersen, J. Am. Chem. Soc., vol. 89, pp. 7017–7036. 1968, Twelve-Membered Polyether Rings. The Cyclic Tetramers of Some Olefin Oxides by R. S. Kern, J. Org. Chem., vol. 33, pp. 388–390, 1968, British Pats. 785,229 and 1,108,921.

Suitable halogenated aliphatic compounds having a boiling point above about 150° C. which may be employed as the modifier compound in the present invention include, for example, such chlorinated aliphatic compounds as hexachlorobutadiene, tetrachlorobutadiene, 1,2,3,3-tetrachlorobutane, 1,2,3-trichloropropene, polyepichlorohydrin diol having an equivalent weight above about 700 up to about 4000, chlorinated paraffins, e.g. Chlorowax #40, 1-mercapto-3-chloropropanol-2, 3-chloropropane - 1,2-diol, 2-chloropropane-1,3-diol, 1,3-dichloro-2-propanol, mixtures thereof and the like.

Suitable cyclic sulfones which may be employed as the liquid modifier compound include the 5-membered cyclic sulfones such as, for example, 3-methylsulfolane (3-methyltetrahydrothiophene-1,1-dioxide) and the like.

Suitable fatty acids and naturally occurring fatty oils which may be employed as the liquid modifier compounds (component E) in the present invention includes, for example, oleic acid, linoleic acid, linolenic acid, and the like. The fatty acids resulting from the hydrolysis of naturally occurring oils of animal and vegetable origin including for example, linseed oil, castor oil, tung oil, fish oil, soya oil and the like and such acids as are produced as by-products in chemical processes including for example, tall oil, the by-product resulting from the conversion of wood pulp to paper by the sulfate process, mixtures of any of the above and the like.

Also operable as the liquid modifier compound are the naturally occurring fatty oils having boiling points above about 150° C. including, for example, linseed oil, castor oil, tung oil, fish oil, soya oil, and the like.

Suitable esters of a carboxylic acid which may be employed as the liquid modifiers in the present invention include those esters prepared from mono- and polycarboxylic acids having from about 1 to about 20 carbon atoms such as for example, phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150° C. and is a liquid at room temperature.

These acid esters may be prepared by condensing an acid having from about 1 to about 20 carbon atoms with a saturated or unsaturated aliphatic alcohol having from about 1 to about 20 carbon atoms, with the proviso that the ester product is a liquid and has a B.P. greater than 150° C.

The term *liquid modifier boiling above about 150° C.* includes eutectic mixtures of the previously described classes of compounds which are solids at atmospheric pressure but said eutectic mixtures are a liquid at room temperature and atmospheric pressure which have boiling points above about 150° C. Also included in the definition are those solid compounds of the classes previously described which are dissolved in a liquid member of any of the described classes of compounds having boiling points above about 150° C. wherein the resultant solution is a liquid at standard conditions of temperature and pressure and have boiling points at atmospheric pressure above about 150° C.

Other components such as cell control agents such as, for example, the silicone oils, liquid or solid fire retardant agents such as phosphorus containing compounds, halogen-containing compounds, antimony-containing compounds, mixtures thereof and the like can also be included in the foam formulation if desired.

In preparing the polyurethane foams of the present invention, the components can be blended in any order of addition such as, for example, the polyol, component (A) is blended with the hydrated salt blowing agent, component (C), the liquid modifier compound, component (E) when such is desired. Then the polyisocyanate, component (B) is blended with the previous blend followed by the addition and blending of the catalyst, component (D). The resultant mixture is then poured into a mold or other suitable container including moving belts wherein the mixture is permitted to expand freely.

The following examples are exemplary of the present invention and are not to be construed as to limiting its scope in any manner.

EXAMPLES 1–11 AND COMPARATIVE EXPERIMENTS A–E

In each of the following examples and comparative experiments, the hydrated salt blowing agent, component (C), was thoroughly mixed with the polyol, component (A) and other components as desired followed by the admixture of the polyisocyanate, component (B) and finally the admixture of the organometal catalyst, component (D).

The mixture was then poured into an open cardboard container wherein the mixture was allowed to rise freely.

The components and results are given in the following Table I.

propylene oxide at a molar ratio of about 1 to 10 respectively and having an OH equivalent weight of about 233.

Polyol E was the reaction product of glycerine with propylene oxide at a molar ratio of about 1 to 25 respectively and having an OH equivalent weight of about 500.

COMPONENT (B), POLYISOCYANATE

Polyisocyanate A was an 80/20 mixture of 2,4-/2,6-toluene diisocyanate having an NCO equivalent weight of about 87.

Polyisocyanate B was polymethylene polyisocyanate having an NCO equivalent weight of 133 and an average functionality of 2.6.

COMPONENT (C), BLOWING AGENT

Blowing Agent A was epsom salts ($MgSO_4 \cdot 7H_2O$) which passed through a 30 mesh U.S. Standard Sieve Series screen, a solubility in anhydrous ethanol at 20° C. of less than 0.8 gram per 100 grams of anhydrous ethanol, and exhibited a weight loss of 27% when 10 grams was placed in a 115° C. oven for 30 minutes.

Blowing Agent B was $CaCl_2 \cdot 6H_2O$ which had a solubility in anhydrous ethanol at 20° C. of greater than 2 grams per 100 grams of anhydrous ethanol.

Blowing Agent C was sodium acetate trihydrate which had a solubility of greater than 2 grams per 100 grams in anhydrous ethanol.

Blowing Agent D was $Al_2(SO_4)_3 \cdot 18H_2O$ which passed through a 30 mesh U.S. Standard Sieve Series screen, a solubility of less than 1.2 grams in 100 grams of anhy-

TABLE I

| | Example 1 | Comparative experiment A | Comparative experiment B | Example 2 | Comparative Experiment C | Comparative Experiment D [4] | Example 3 | Example 4 |
|---|---|---|---|---|---|---|---|---|
| Component (A), polyol, type/gms | A/30 | A/30 | A/30 | A/30 | A/30 | A/30 | B/18, C/12 | A/30 |
| Component (B), polyisocyanate, type/grams | A/30 | A/30 | A/30 | A/30 | A/30 | A/30 | A/30 | A/30 |
| Component (C), blowing agent, type/grams | A/30 | B/30 | C/30 | D/20 | A/30 | D/20 | A/10 | D/5 |
| Alcohol solubility, g/100 cc | 0.8 | >2.0 | >2 | <1.2 | 0.8 | <1.2 | <0.8 | <1.2 |
| Percent wt. loss at 115° C. for 30 min | 27 | N.D | N.D | 14 | 27 | 14 | 27 | 14 |
| Component (D), catalyst, type/cc | A/0.9 | A/0.9 | B/0.8 | B/0.3 | None | C/0.3 | D/1 | A/1 |
| Component (E), liquid modifier, type/grams | None | None | None | None | do | None | A/20 | A/20 |
| Cell control agent, type/grams | A/3 | A/3 | A/3 | A/1.5 | B/2 | A/1.5 | None | None |
| Cream time, sec | 40 | 30 | N.D | N.D | N.D | N.D | N.D | 45 |
| Foam time, sec | 75 | 90/5 min.[1] | 45 | 20 | 30 min | 60 | 20 | 60 |
| Foam type | Rigid | Rigid | Rigid | Rigid | Rigid | Rigid | Rigid | Rigid |
| Density, lbs./ft.[3] | 3.2 | 3.2 | 3.4 | 3.4 | 6.3 | 3.5 | 4.7 | 10.3 |
| Compressive strength: [2] | | | | | | | | |
| 10% deformation, p.s.i | 25.8 | 1.0 | <0.5 | 12.2 | 5 | 3.75 | 18 | 137 |
| 25% deformation, p.s.i | 28.2 | 1.6 | N.D | N.D | N.D | N.D | N.D | 163 |
| Remarks | | Low quality foam of poor strength | | | Still tacky after 1 hr. | Very brittle and friable. | | |

| | Example 5 | Example 6 | Example 7 | Example 8 | Experiment E | Example 9 | Example 10 | Example 11 | Example 12 |
|---|---|---|---|---|---|---|---|---|---|
| Component (A), polyol, type/grams | A/30 | A/30 | A/30 | A/30 | A/30 | B/23 | D/60 | E/55 | A/30 |
| Component (B), polyisocyanate, type/grams | A/30 | A/30 | A/30 | A/30 | A/30 | B/46 | A/30 | A/15 | A/30 |
| Component (C), blowing agent, type/grams | A/30 | F/2 | G/10 | H/10 | A/30 | A/25 | A/15 | I/10.00 | I/10.00 |
| Alcohol solubility, g./100 cc | <0.8 | <1.0 | 0.4 | <0.4 | N.D | <0.8 | 0.8 | 0.8 | <1.2 |
| Percent wt. loss at 115° C. for 30 min | 27 | 22 | 17 | 21 | <1 | 27 | 27 | 27 | 11 |
| Component (D), catalyst, type/cc | E/1 | B/1 | E/0.2 | B/1 | B/1 | E/1 | B/0.4 | B/0.5 | None |
| Component (E), liquid modifier, type/grams | None | None | A/20 | A/10 | A/20 | None | None | None | A/20 |
| Cell control agent, type/grams | B/3 | B/3 | B/2 | None | None | do | do | do | None |
| Cream time, sec | N.D | 40 | 40 | N.D | N.A | 30 | N.D | N.D | N.D |
| Foam time, sec | <300 | 90 | 70 | 20 | N.A | 60 | <300 | ca 300 | 60 |
| Foam type | Rigid | Rigid | Rigid | Rigid | N.A | Rigid | Semi-flexible | Flexible | Rigid |
| Density, lbs./ft.[3] | 6.7 | 16 | 10 | 2.7 | >62 | 10.2 | 13 | 8.8 | 4.6 |
| Compressive strength: [2] | | | | | | | | | |
| 10% deformation, p.s.i | 20.2 | 94 | 243 | 6 | N.A | N.D | N.D | N.D | N.D |
| 25% deformation, p.s.i | N.D | N.D | N.D | N.D | N.A | N.D | N.D | N.D | N.D |
| Remarks | [5] | | | | [6] | | | | |

[1] Foam completed its expansion within 90 secs. but was still tacky after 5 min.
[2] Determined by ASTM.
[3] Infrared analysis of the foam indicated that there was not a significant quantity of disubstituted ureas present.
[4] Infrared analysis of the foam indicated that there was a significant quantity of disubstituted ureas present.
[5] This foam was self-extinguishing by ASTM D-1692-70.
[6] Solidified within 20 sec. without any expansion.

NOTE.—N.D.=Property was not determined; N.A.=Not applicable since product did not foam.

COMPONENT (A), POLYOL

Polyol A was the reaction product of glycerine with propylene oxide at a molar ratio of about 1 to 3 respectively and having a molecular weight of about 260.

Polyol B was dipropylene glycol.

Polyol C was the reaction product of sucrose with propylene oxide in a molar ratio of about 1 to 18 respectively and having an OH equivalent weight of about 175.

Polyol D was the reaction product of glycerine with drous ethanol and a weight loss of 14% when 10 grams was placed in a 115° C. oven for 30 minutes.

Blowing Agent E was $FeSO_4 \cdot 7H_2O$ which passed through a 30 mesh U.S. Standard Sieve Series screen, a solubility in anhydrous ethanol at 20° C. of less than 1.0 and a weight loss of 22% when a 10 gram sample was placed in a 115° C. oven for 30 minutes.

Blowing Agent F was $Na_2CO_3 \cdot H_2O$ which passed through a 30 mesh U.S. Standard Sieve Series screen, a solubility in anhydrous ethanol at 20° C. of less than 0.4/100 grams, and a weight loss of 17% when a 10 gram sample was placed in a 115° C. oven for 30 minutes.

Blowing Agent G was $Na_2B_4O_7 \cdot 10H_2O$ which passed through a 30 mesh U.S. Standard Sieve Series screen, a solubility in anhydrous ethanol at 20° C. of less than 0.4 g./100 g., and a weight loss of 21% when a 10 gram sample was placed in a 115° C. oven for 30 minutes.

Blowing Agent H was $Al_2O_3 \cdot 3H_2O$ which passed through a 30 mesh U.S. Standard Sieve Series screen, and had a weight loss of less than 1% when a 10 gram sample was placed in a 115° C. oven for 30 minutes.

Blowing Agent I was $Na_2Al_2O_4 \cdot 3H_2O$ which had a solubility in anhydrous ethanol of less than 1.2 grams/100 grams of anhydrous ethanol at 20° C. and a weight loss of about 11% when a 10 gram sample was placed in a 115° C. oven for 30 minutes.

COMPONENT (D), CATALYST

Catalyst A was lead octoate containing 24% lead diluted with 90% by weight of Varsol®, a petroleum solvent commercially available from Humble Oil and Refining Co.

Catalyst B was undiluted lead octoate containing 24% lead.

Catalyst C was a 33% solution of triethylenediamine in dipropylene glycol.

Catalyst D was a commercial form of stannous octoate available from M&T Chemicals, Inc.

Catalyst E was dibutyl tin dilaurate.

LIQUID MODIFIER

Liquid Modifier A was dioctylphthalate.

CELL CONTROL AGENTS

Cell Control Agent A was a liquid polysiloxane commercially available from Dow Corning Corporation as DC-192.

Cell Control Agent B was a liquid polysiloxane commercially available from Dow Corning Corporation as DC-1310.

What is claimed is:

1. A process for preparing a polyurethane foam which is substantially free of disubstituted ureas which comprises reacting in the absence of an external source of heat
    (A) a polyether polyol or ester-modified polyether polyol having an average hydroxyl functionality of from about 2 to about 8 and an average hydroxyl equivalent weight of from about 31 to about 1000 with
    (B) an organic polyisocyanate having an average functionality of at least about 2 in the presence of
    (C) as a blowing agent therefor, from about 1 to about 70 parts by weight based upon the combined weight of (A), (B) and (C) of an inorganic metal hydrate salt characterized as having a solubility in anhydrous ethanol at 20° C. of less than 1.2 grams per 100 grams of ethanol and which exhibits a weight loss of greater than about 5% when subjected to a temperature of 115° C. for 30 minutes, and
    (D) as a catalyst for urethane formation, from about .01 to about 5 parts by weight based upon the combined weight of (A), (B), and (C) of a heavy metal carboxylate catalyst for urethane formation,
with the proviso that when component (A) has an average functionality of 2, component (B) has an average functionality of greater than 2.5 and wherein components (A) and (B) are present in quantities so as to provide an NCO:OH ratio of from about 0.8:1 to about 2:1, with the further proviso that when component (C) is a hydrated alkali metal aluminate then component (D) can be absent from the composition.

2. The process of claim 1 wherein component (C) is present in quantities of from about 3 to about 50 and components (A) and (B) are present in quantities such that the NCO:OH ratio is from about 0.9:1 to about 1.5:1.

3. The process of claim 2 wherein component (A) has an average functionality of at least 3 and component (B) is an organic diisocyanate.

4. The process of claim 3 wherein component (C) is selected from the group consisting of $Al_2(SO_4)_3 \cdot 18H_2O$, $CaHPO_4 \cdot 2H_2O$, $CaSO_4 \cdot 2H_2O$, $FeSO_4 \cdot 7H_2O$, $Na_2B_4O_7 \cdot 10H_2O$, $Na_2SO_4 \cdot 10H_2O$, $Na_2CO_3 \cdot H_2O$, $MgSO_4 \cdot 7H_2O$, $CaSiF_6 \cdot 2H_2O$, $Mg(NH_4)PO_4 \cdot 6H_2O$ and $Na_3PO_4 \cdot 12H_2O$.

5. The process of claim 1 wherein component (C) is a hydrated alkali metal aluminate and the quantity of component (D) is zero.

6. The process of claim 5 wherein component (C) is $Na_2Al_2O_4 \cdot 3H_2O$.

References Cited

UNITED STATES PATENTS

| 2,577,279 | 12/1951 | Simon et al. | 260—2.5 |
| 2,926,147 | 2/1960 | Rappaport et al. | 260—2.5 |

FOREIGN PATENTS

| 1,806,404 | 6/1969 | Germany | 260—2.5 |
| 690,621 | 7/1964 | Canada | 260—2.5 |

MAURICE J. WELSH, JR., Primary Examiner

G. R. MARSHALL, Assistant Examiner

U.S. Cl. X.R.

260—2.5 AE, 2.5 AP

PO-1050
(5/69)

UNITED STATES PATENT OFFICE
CERTIFICATE OF CORRECTION

Patent No. 3,751,392      Dated Aug. 7, 1973

Inventor(s) Franciszek Olstowski

It is certified that error appears in the above-identified patent and that said Letters Patent are hereby corrected as shown below:

Col. 2, l. 45, before the opening bracket in the formula, insert --A--.

Signed and sealed this 15th day of October 1974.

(SEAL)
Attest:

McCOY M. GIBSON JR.
Attesting Officer

C. MARSHALL DANN
Commissioner of Patents